June 15, 1965   E. BOWERS ETAL   3,188,744
MICROMETER GAUGES
Filed Feb. 12, 1962   2 Sheets-Sheet 1
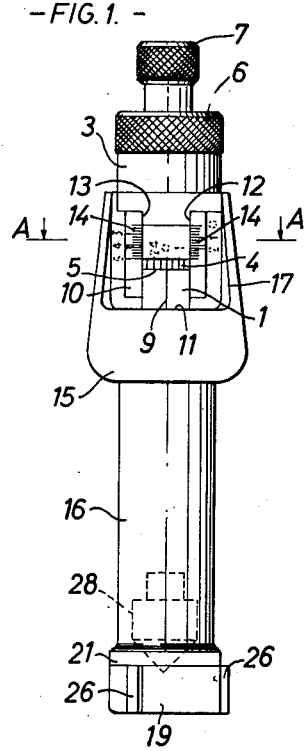
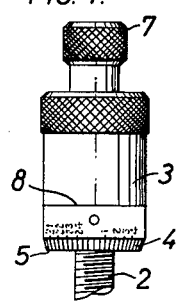
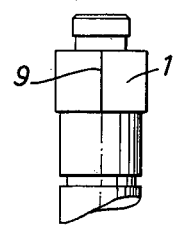
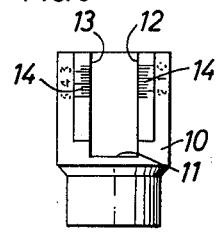
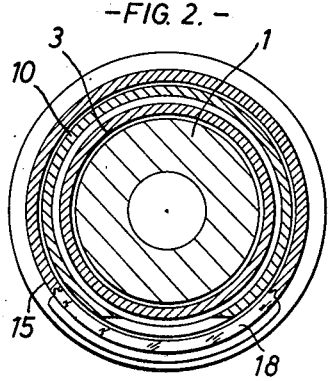
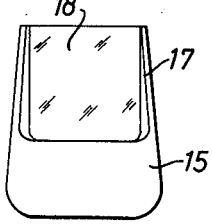

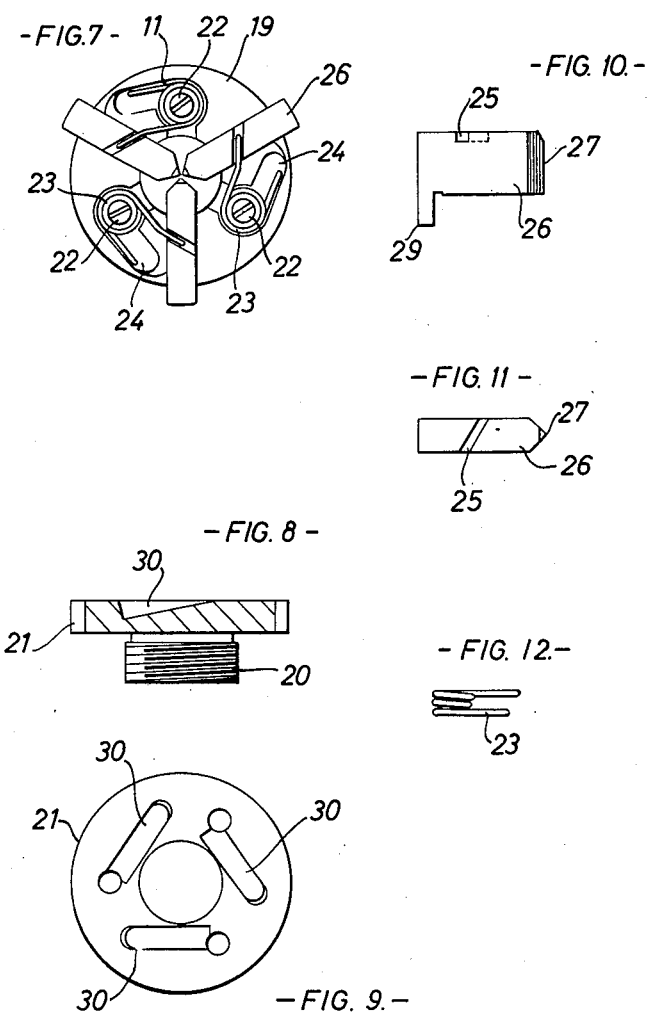

United States Patent Office 3,188,744
Patented June 15, 1965

3,188,744
MICROMETER GAUGES
Eric Bowers, Cottingley, Bingley, and Gordon Bowers and John F. Bennett, Bradford, England, assignors to Bowers Internal Gauge Company Limited, Bradford, England, a British company
Filed Feb. 12, 1962, Ser. No. 172,661
1 Claim. (Cl. 33—178)

This invention relates to micrometer gauges used for measuring purposes.

Micrometer gauges are made in various forms according to the purpose for which they are required, such as for external and internal measuring. The normally accepted form comprises a barrel with graduations and indicative figures thereon and a rotary thimble which controls an axial spindle which either operates one or more anvils or forms an anvil. The thimble is graduated with indicative figures about its rim. With this arrangement, as the thimble is rotated for setting its graduations in relation to the fixed graduations on the barrel, and the thimble moves axially it is covering some of the graduations and figures. Thus often it is not easy to read the micrometer and some mental adjustment is required.

It is the main object of the present invention to overcome the above problem and provide a clear reading micrometer gauge and also to provide an improved internal micrometer.

Accordingly there is provided a micrometer gauge, wherein the adjusting means include in concentric arrangement, an inner barrel, a rotary thimble and an outer gapped barrel, all with graduation markings, the arrangement being such that peripheral markings on the thimble are settable to an axial datum line on the inner barrel and an annular datum line or edge on the thimble is settable to graduations on at least one edge of the gap in the outer barrel, whereby the setting and reading of the gauge is facilitated.

The improved gauge may have cover means extending at least over the graduated parts of the adjusting means, said cover means being wholly or partly transparent. The cover means may be a cowl-like element with a transparent window and serve as gripping means.

The improved gauge may be for external or internal measuring. For the latter type a number of radially-disposed anvils in a head may be movable outwardly by a taper-nosed member controlled by the thimble, each anvil being retained and independently returned by a spring wire located in said head. The complete head may be a removable two-part unit.

The invention will now be more particularly described with reference to the accompanying drawings, in which:

FIG. 1 is an elevation of one form of internal micrometer gauge constructed according to the invention;

FIG. 2 is an enlarged cross-sectional view on line A—A of FIG. 1;

FIG. 3 is a detail view of the inner barrel forming part of the adjusting means;

FIG. 4 is a detail view of the rotary control thimble;

FIG. 5 is a detail view of the outer barrel;

FIG. 6 is a detail view of the cover means for the adjusting means;

FIG. 7 is a plan view from above of part of the gauge head;

FIG. 8 is a part sectional inverted elevation of a cover plate forming the second part of the head;

FIG. 9 is a plan view of FIG. 8;

FIG. 10 is a detail of one of the gauge anvils;

FIG. 11 is a plan view of FIG. 10; and

FIG. 12 is a detail elevation of one of the anvil springs.

In the embodiment of this invention shown in FIGS. 1 to 6, the adjusting means for any type of micrometer gauge comprises an inner fixed barrel 1 through which the usual screw-threaded spindle 2 passes to have longitudinal movement under the control of a rotary thimble 3 which partly embraces the inner barrel. Such thimble is of known construction with graduations 4 and characteristic figure markings about its tapering inner rim 5 and furnished with a knurled gripping annular part 6. There is also the usual axially projecting additional fine setting or locking thimble 7.

According to the improvement this thimble 3 is also furnished with a ring-shaped line 8 set back from the graduated rim 5 a predetermined distance and this forms a datum setting line. Alternatively, the thimble rim edge may serve as this datum line. Also, the inner barrel 1 is simply provided with an axial datum line 9 to which the graduations 4 around the rim of the thimble can be set.

In this improved construction an outer barrel 10 is located concentrically over the inner barrel 1 and part of the thimble 3, which thimble can be rotated freely within this outer barrel 10. The outer barrel is gapped at 11 from its outer end for a predetermined distance and along at least one edge 12 or 13 are formed graduations with characteristic indicative figures to form a longitudinal scale. Both edges of this gap are shown to have scales 14 and both these edges are tapered inwardly to a substantially knife-edge to facilitate reading. This outer barrel is also fixed, conveniently onto the inner barrel. Preferably, but not necessarily, cover means are associated with the graduated parts and such cover means may be wholly or partly transparent. In the illustrated construction the cover means comprise a substantially cowl-like element 15 which is rounded off at one end, at its largest diameter, where it is fixed onto a shank 16 of the outer barrel, or other convenient part. Then the element 15 tapers towards its outer open end where it is embracing the thimble 3 and an open-ended slot 17 is formed from this end in the wall of the element to receive a transparent window 18. This element 15 may be shaped to act as a depth stop or guide or for some other purpose.

With the above arrangement the cover means 15, 18 will serve to keep the graduated parts clean and free from deleterious matter whilst allowing them to be readily visible. By providing graduations 14 on an outer gapped barrel 10 the thimble graduations 4 can readily be set to the inner barrel datum line 9 and the ring datum line 8 on the thimble set to the graduations 14 on the outer barrel 10. In this manner there is no possibility of any graduations being obscured as hitherto and a clear precise reading is obtainable.

The drawings show an internal micrometer gauge furnished with the above improved adjusting means and at its other end provided with a removable head unit 19, see particularly FIGS. 7 to 12, which conveniently can be screwed by part 20 into the end of the barrel-like shank 16 of the gauge. This head is in two parts, 19 and cover plate 21, which are held together by longitudinally-disposed screws 22 each of which forms the location means for independent wire springs 23 which are coiled about the screws and have two projecting legs. One leg of each spring fits into an anchoring recess 24 in the head and the other projects into a groove 25 in the edge of a slidable anvil 26 mounted in a slot in the inner face of the head 19. The inner ends 27 of all the anvils are substantially knife-edged and nest together to be operated on by a taper-nosed element 28 within and projecting from the shank of the gauge. Each anvil has a longitudinally-disposed part 29 which at rest lies in a peripheral longitudinal slot formed in the head 19.

With this arrangement a complete head with anvils and springs can readily be removed from the gauge and the head split open for maintenance purposes or the fitting of differently-shaped anvils. The grooves in the anvils are set at an angle which will allow anvils to be withdrawn axially as the spring legs will slide out of the grooves. To enable anvils to be pushed radially into position clearance recesses 30 are formed in the face of the second, cover plate, part 21 of the head to allow the spring legs to ride up over the anvils and then drop into the anvil grooves.

What we claim is:

In a micrometer gauge for internal measurements, the combination comprising a measuring head including a plurality of radially disposed anvils therein, each said anvil having a groove in its upper edge receiving one leg of a coiled anvil-returning spring, the other leg of each spring being located in a recess in said head, a spring retaining screw passing through the coiled portion of each spring into said head, said head being comprised of two parts held together by said screws, one of said head parts serving as a cover plate the face of which is provided with a clearance recess for each said anvil enabling the legs of said springs to ride up over said anvils and then drop into the respective grooves in said anvils, an inner barrel, an axial datum line on said inner barrel, an anvil adjusting screw spindle passing axially through said barrel and including a nose portion engaged with said anvils for moving said anvils in a radially outward direction, a rotary control thimble on said screw spindle for giving the latter axial movement, said thimble being provided with a graduated rim portion and a datum line in the form of a ring extending around said thimble, an outer fixed barrel embracing said inner barrel and part of said thimble, said outer barrel including axial graduations to establish a longitudinal scale and being gapped to reveal said graduations on said rim portion of said thimble, said graduations on said thimble being settable to said axial datum line on said inner barrel and said ring datum line on said thimble being settable to said axial graduations on said outer barrel thereby to facilitate setting and reading of said gauge, and a cylindrical cover extending at least over the graduated parts and which is provided with a transparent window portion in which to view said graduations, said cylindrical cover also serving as a means by which said gauge may be gripped.

References Cited by the Examiner

UNITED STATES PATENTS

| | | | |
|---|---|---|---|
| 1,124,867 | 1/15 | Crescio | 33—166 |
| 1,547,668 | 7/25 | Poltin | 33—178 |
| 2,349,604 | 5/44 | Barrows | 33—166 X |
| 2,400,371 | 5/46 | Reeser | 33—164 |
| 2,604,703 | 7/52 | Meyer | 33—178 |
| 2,782,517 | 2/57 | Daniel | 33—170 |

FOREIGN PATENTS 312,252  2/56  Switzerland.

ISAAC LISANN, *Primary Examiner.*